United States Patent
Geborek et al.

(10) Patent No.: US 7,499,779 B2
(45) Date of Patent: Mar. 3, 2009

(54) METHOD AND SYSTEM FOR DETECTING A VEHICLE ROLLOVER

(75) Inventors: Mariusz Geborek, Cracow (PL); Daniel Sygnarowicz, Wojnicz (PL)

(73) Assignee: Delphi Technologies, Inc., Troy, MI (US)

( * ) Notice: Subject to any disclaimer, the term of this patent is extended or adjusted under 35 U.S.C. 154(b) by 455 days.

(21) Appl. No.: 11/238,776

(22) Filed: Sep. 29, 2005

(65) Prior Publication Data

US 2006/0074534 A1    Apr. 6, 2006

(30) Foreign Application Priority Data

Oct. 1, 2004   (EP)   ................... 04023479

(51) Int. Cl.
*G05D 1/00* (2006.01)
(52) U.S. Cl. ..................... 701/38; 280/5.502
(58) Field of Classification Search ............ 701/1, 701/36–39, 45, 46, 49; 180/252, 268, 282, 180/440, 438, 461, 463, 429; 280/5.502, 280/5.506
See application file for complete search history.

(56) References Cited

U.S. PATENT DOCUMENTS

| | | | | |
|---|---|---|---|---|
| 6,654,671 | B2 * | 11/2003 | Schubert | 701/1 |
| 6,694,225 | B2 * | 2/2004 | Aga et al. | 701/1 |
| 7,308,350 | B2 * | 12/2007 | Brown et al. | 701/70 |
| 2003/0163231 | A1 | 8/2003 | Meyers et al. | |
| 2003/0182041 | A1 * | 9/2003 | Watson | 701/45 |
| 2004/0064237 | A1 * | 4/2004 | Lu et al. | 701/70 |
| 2006/0036360 | A1 * | 2/2006 | Schubert et al. | 701/70 |

FOREIGN PATENT DOCUMENTS

EP    1 346 883    9/2003

OTHER PUBLICATIONS

European Search Report, EP Ser. No. 04 02 3479, dated Apr. 27, 2005.

* cited by examiner

*Primary Examiner*—Dalena Tran
(74) *Attorney, Agent, or Firm*—Douglas D. Fekete

(57) ABSTRACT

The present invention relates to a method and system for detecting a vehicle rollover or dangerous situations that may precede a rollover of a vehicle. The method comprises the steps of (a) measuring the set of input signals including at least vehicle velocity, vehicle steering angle, vehicle lateral acceleration, and vehicle roll rate; (b) integrating the vehicle roll rate to obtain the vehicle roll angle increment; (c) determining the vehicle state on the basis of the input signals; (d) determining the vehicle estimated lateral acceleration, corresponding to the vehicle true roll angle, on the basis of at least the vehicle state, vehicle lateral acceleration and the centrifugal acceleration; (e) determining the vehicle estimated roll angle on the basis of at least the vehicle roll angle increment, the vehicle estimated lateral acceleration and the vehicle state; and (f) generating an output activation signal determining a possibility of rollover of the vehicle, as a function of at least: vehicle estimated roll angle and the vehicle roll rate.

12 Claims, 10 Drawing Sheets

METHOD AND SYSTEM FOR DETECTING A VEHICLE ROLLOVER

TECHNICAL FIELD

The present invention relates to a method and system for detecting a vehicle rollover or dangerous situations that may precede a rollover of a vehicle.

BACKGROUND OF THE INVENTION

The purpose of the rollover detection system is activation of protection devices such as seat belts pretensioners, pop-up rollover bars or air bags, especially air bags protecting occupants during rollover accident.

There are number of ways for detecting rollover events. The most of the current systems use angular rate sensor (ARS) for calculating vehicle angle with respect to the horizontal plane. In such solutions, the algorithm numerically integrates the time dependent roll rate signal and provides the roll rate based angle as an output. As the ARS sensor signal always contains some errors (e.g. sensor drift, noise, etc.), these errors are accumulated during the integration process. As a result, the long term integration of ARS signal, without additional corrective mechanisms, can not be relied upon in determining the car inclination.

Known solutions, e.g. disclosed in U.S. Pat. No. 6,618,656, which are incorporated herein by reference, provide kinds of blending of the roll rate based angle with an accelerometer based angle. Nevertheless even in the case of using two independent accelerometers, during specific driving scenarios the averaged accelerometer based angle may contain errors.

SUMMARY OF THE INVENTION

The aim of the present invention is to provide an inexpensive and reliable solution for detecting the vehicle rollover using only the angular rate sensor (ARS) and lateral Low-G sensor (YLG) signals, as well as a few additional signals provided by external vehicle control systems, installed in almost all modern vehicles, and available at the vehicle communication bus.

The roll rate based angle is more accurate in case of quick car rotations. On the other hand accelerometer based angle is more accurate during slow and steady changes of car position as angle is calculated on the basis of the short term sensor measurements and does not depend on previous measurements, as opposite to the roll rate based angle. Consequently, another aim of the invention is to provide the reliable trade-off between these oppositions.

According to the invention there is provided a method for detecting a vehicle rollover, comprising the steps of (a) measuring the set of input signals including at least vehicle velocity, vehicle steering angle, vehicle lateral acceleration, and vehicle roll rate; (b) integrating the vehicle roll rate to obtain the vehicle roll angle increment; (c) determining the vehicle state on the basis of the input signals; (d) determining the vehicle estimated lateral acceleration, corresponding to the vehicle true roll angle, on the basis of at least the vehicle state, vehicle lateral acceleration and the centrifugal acceleration; (e) determining the vehicle estimated roll angle on the basis of at least the vehicle roll angle increment, the vehicle estimated lateral acceleration and the vehicle state; and (f) generating an output activation signal determining a possibility of rollover of the vehicle, as a function of at least vehicle estimated roll angle and the vehicle roll rate.

Advantageously the vehicle state and/or other signals are additionally used as inputs for said function generating an output activation signal.

The vehicle state is preferably chosen from at least parking, straight driving and turning.

The calculation of the centrifugal acceleration performed in step (d) of determining the vehicle estimated lateral acceleration, is preferably based on the vehicle velocity and the vehicle turn radius.

In such a case the turn radius is preferably calculated as a function of a steering angle, vehicle parameters and vehicle velocity.

Said function generating an output activation preferably comprises a sequence of serially executed steps of checking whether input values are simultaneously higher than the boundary values defined separately for each step, said sequence starting with the higher boundary values.

Alternatively said function generating an output activation signal may be a lookup table.

A method according to the invention preferably further comprises the step of activation at least one protection device for an occupant of a vehicle.

According to the invention there is provided a system for detecting a vehicle rollover implementing the method described above.

The method and system of the present invention guarantee accurate calculation of car roll angle during all recognizable driving conditions. As initial roll angle error calculated by the algorithm (before the rollover event occurrence) is vital for accurate prediction and detection of rollover event, the invented method results in exceptional rollover detection performance and enables to avoid false triggering.

The method and system of the invention is efficient and inexpensive. It requires only two sensors i.e. ARS and YLG; the rest of the signals, which are usually available in each modern vehicle are retrieved from the communication bus thereof.

By introducing the vehicle state or driving scenario parameter, the absolute angle error of the algorithm operation can be greatly reduced, as the algorithm features some sort of an "artificial intelligence".

BRIEF DESCRIPTION OF THE DRAWINGS

The invention is presented below with reference to exemplary embodiment and drawings on which.

DESCRIPTION OF THE PREFERRED EMBODIMENT

Figure 1:
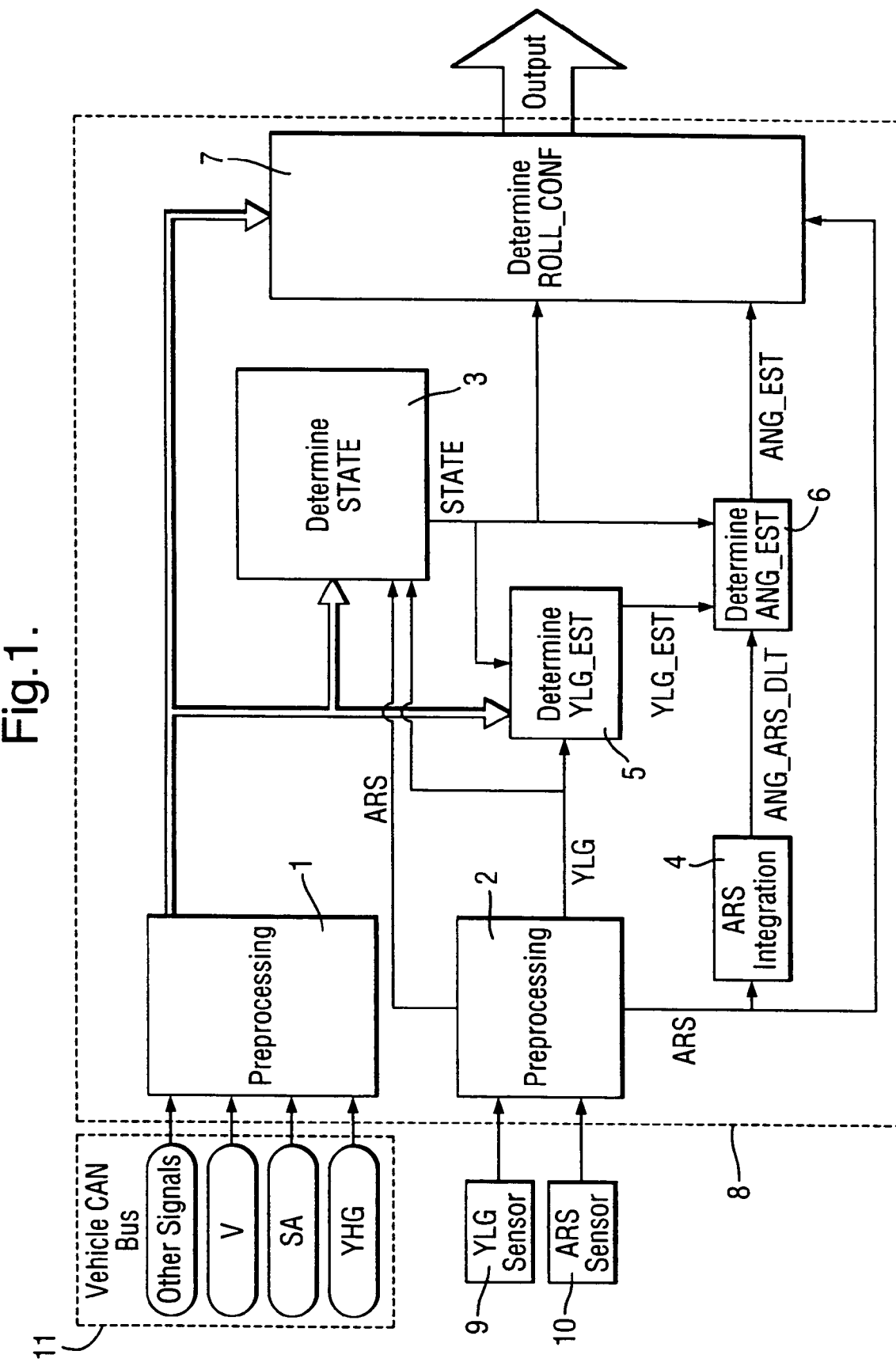
FIG. 1 is a block and circuit diagram of one embodiment of a microcontroller realizing the method of the present invention.

An exemplary microcontroller 8 implementation of the present invention is shown in FIG. 1, where all the essential features of the invention are implemented as a modular system comprising seven electronic circuits or processing blocks 1 to 7, cross linked with each other as described below. It is to be understood, however that other, in particular software implementations of the invention are possible as well.

The microcontroller 8 comprising processing blocks 1 to 7 is connected to vehicle lateral acceleration (YLG) sensor 9 and vehicle roll rate (ARS) sensor 10. Furthermore, the microcontroller 8 receives the vehicle velocity (V), additional high-g lateral acceleration (YHG) and vehicle steering angle (SA) signals from the vehicle communication bus 11.

The preferable ranges and resolutions of the ARS and YLG sensors are presented in the Table 1 below.

TABLE 1

|  | Sensor Range | Sensor Resolution |
|---|---|---|
| ARS | −200 ... 200 deg/s | 0.5 deg/s |
| YLG | −2 ... 2 g | 0.01 g |

Blocks 1 and 2 are pre-processing blocks. Block 1 processes steering angle, vehicle velocity and other signals delivered by other car subsystems, received from the vehicle communication bus, while ARS and YLG sensors 9 and 10 are connected to the block 2. The term "pre-processing", as used herein, involves noise removal, signal drift removal, low pass filtering, scaling and/or other actions on input signals, as well as their combinations. Pre-processing involves also testing the accessibility and validity of ranges of the input signals. All operations of the above kind are well known to persons skilled in the art.

After pre-processing all signals are delivered to the block 3, which determines the vehicle state, which is a characteristic feature of the present invention.

Figure 2:
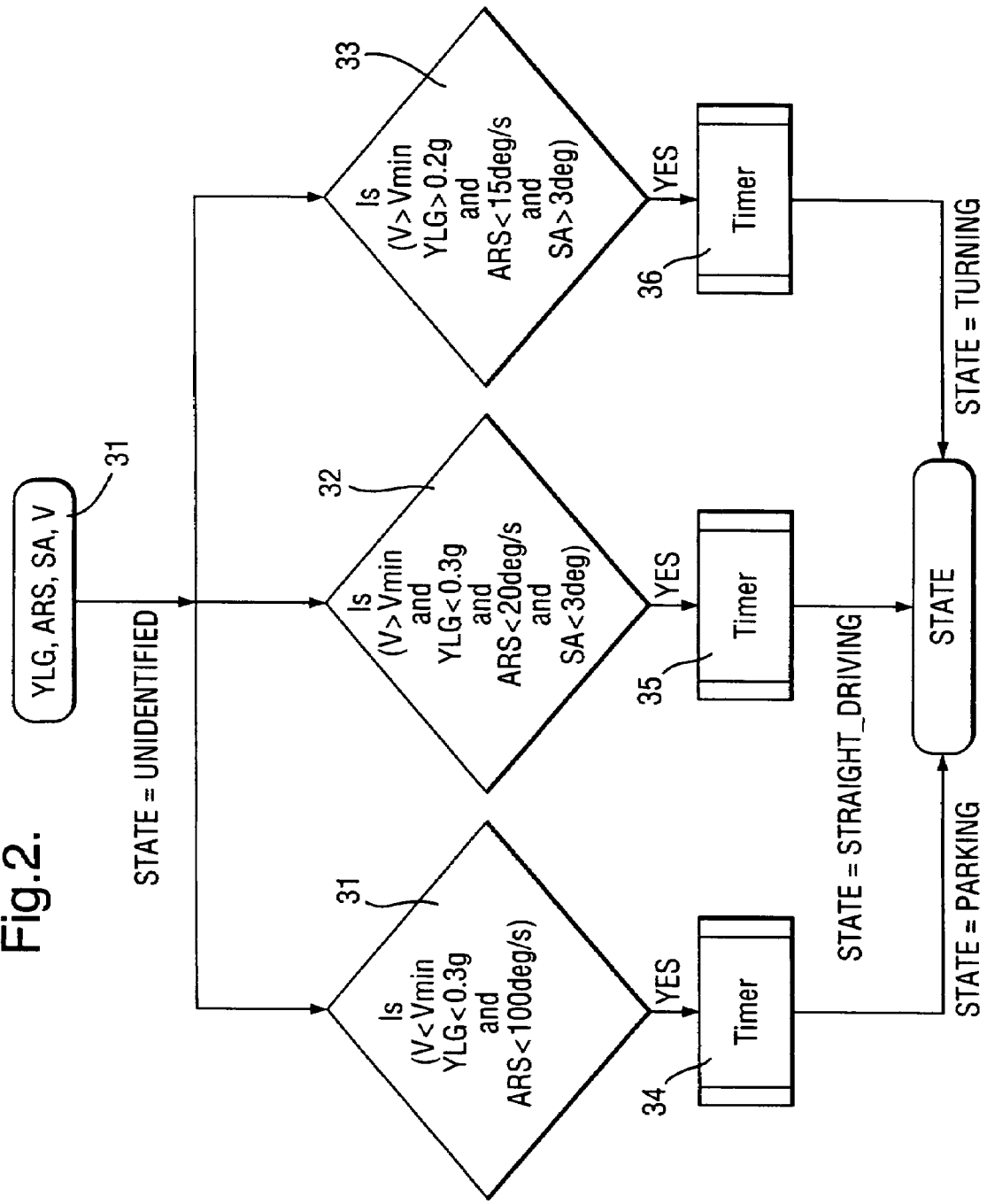
FIG. 2 is a flowchart of an embodiment of a block 3 from FIG. 1.

An exemplary and relatively simple implementation of the block 3 is presented in a form of a flowchart in FIG. 2. The input signals 31 of this block are vehicle velocity (V), vehicle lateral acceleration, as determined by lateral low-g sensor (YLG), vehicle roll rate (ARS) and vehicle steering angle (SA). The output of the block 3 is the vehicle state chosen from PARKING, STRAIGHT_DRIVING, TURNING or UNIDENTIFIED.

As shown, the state is preliminary set to UNIDENTIFIED. Subsequently the algorithm checks if the conditions corresponding to a specific state, other than UNIDENTIFIED are fulfilled. If the vehicle velocity is less than $V_{min}$ and simultaneously the vehicle lateral acceleration is less than 0.3 g and the vehicle roll rate is less than 10 deg/s, the decision block 31 is activated. The activation of the block 31 is verified by the timer block 34 for a predetermined period. The verification denotes checking if the activation conditions are constantly met in this period, and if so the vehicle state is eventually set to PARKING.

In case the vehicle velocity is greater than $V_{min}$ two other vehicle states may be determined. Firstly, if the vehicle lateral acceleration is less than 0.3 g, the vehicle roll rate is less than 20 deg/s and the vehicle steering angle is less than 3 deg the activation of the decision block 32 verified by the timer block 35 for a predetermined period, sets the state to STRAIGHT_DRIVING. Secondly, if simultaneously the YLG is greater than 0.2 g, the ARS is less than 15 deg/s and the SA is greater than 3 deg the vehicle state determined by decision block 33 and verified by the timer block 36 shall indicate the TURNING state.

In a situation other than limited by the conditions indicated above the block 3 shall return the preliminary set UNIDENTIFIED state.

Predetermined periods or time windows of timer blocks 34, 35 and 36, are set in this embodiment to two seconds. In other words, if the activation conditions of a given block 31, 32 or 33 are fulfilled during the last two seconds before making the assessment, the corresponding output STATE is set. Obviously the time windows may also be set individually for each timer block. The algorithmic implementation of this operation is relatively easy for persons skilled in the art.

Other embodiments of a block 3 may recognize much more vehicle states (e.g. quick slalom, side slide, spinning), as the vehicle state assessment performed by block 3 is a key factor of the whole system reliability. Consequently the block 3 is the most important and most complex part of the rollover detection system of the present invention that for a given vehicle should be implemented individually. Other signals such as weight, geometry and type of the vehicle, installed protection devices, centre of gravity and presence of other rollover detection systems may also be used by various algorithms implementing the block 3 function.

Figure 3:
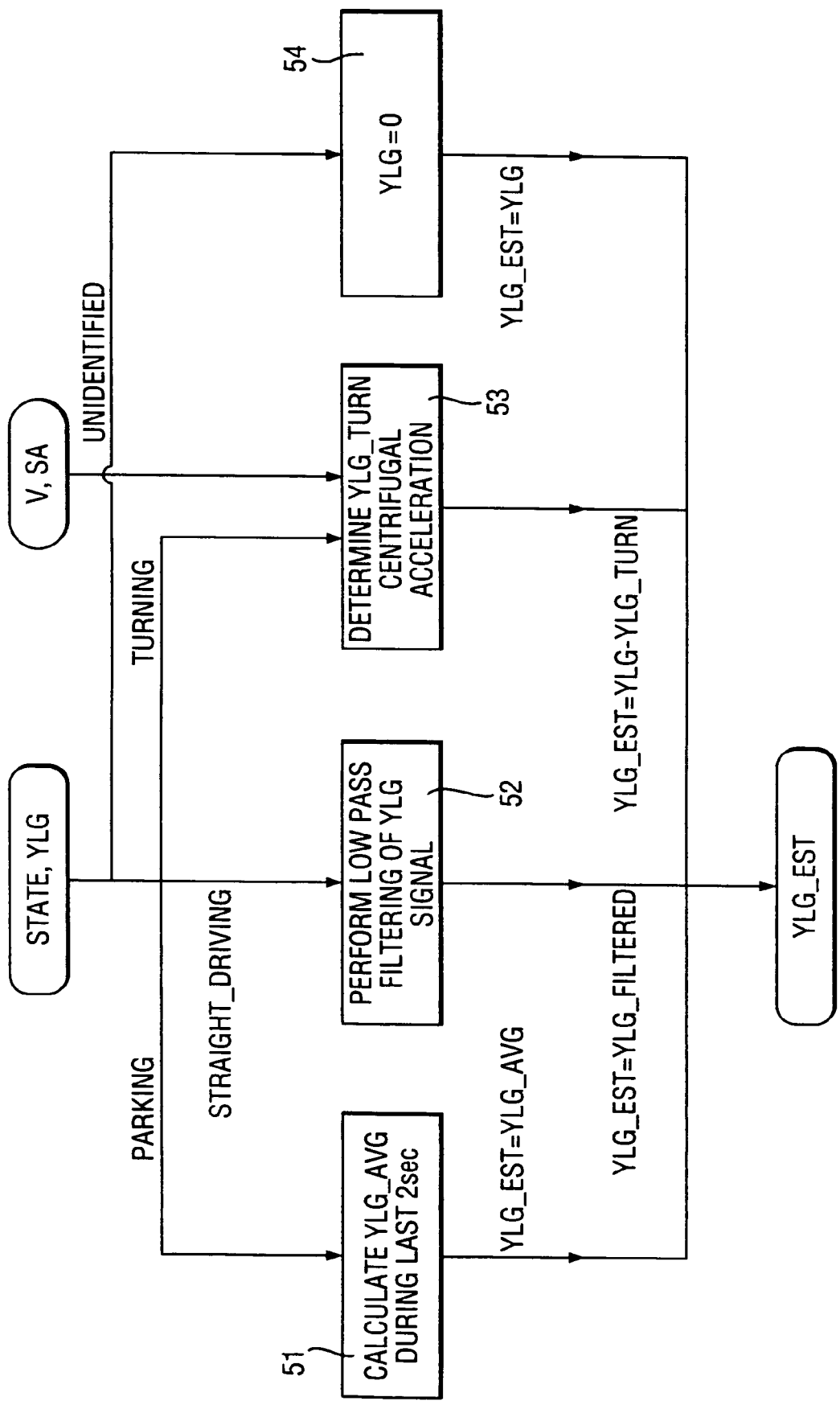
FIG. 3 is a flowchart of an embodiment of a block 5 from in FIG. 1.

The vehicle state determined by block 3 becomes the input value of the block 5, example embodiment of which is shown in FIG. 3. The aim of this block is to calculate the vehicle estimated lateral acceleration (YLG_EST), corresponding to the vehicle true roll angle. On the base of the vehicle state, block 5 corrects the measured lateral acceleration value (YLG) by removing the factors not indicating the true vehicle position and originating from the vehicle movement.

As shown, if the vehicle state is PARKING the YLG_EST value is calculated by the block 51 as the moving average value of the YLG signal during the last two seconds.

If the vehicle is driving straight (STATE=STRAIGHT_DRIVING), the YLG_EST value is calculated by the block 52 as the low pass filtered value of the YLG signal.

If the vehicle state is UNDENTIFIED the YLG_EST is set by the block 54 to zero.

When the vehicle turns, the body thereof is subjected to centrifugal force. The centrifugal force influences the measured lateral acceleration, which now becomes a combination of factual vehicle lateral acceleration and the centrifugal acceleration. As only the first one originates from the vehicle inclination and may indicate the rollover event, it is desirable to introduce correction mechanisms in order to remove the centrifugal factor from the measured acceleration value.

The centrifugal acceleration may be calculated as:

$$YLG\_TURN = V^2/R$$

where V is the vehicle linear velocity, accessible on the vehicle communication bus and R is the turn radius. The turn radius may be easily expressed as a function of a steering angle. However, mainly, due to the vehicle sliding, which intensity in turn depends not only on vehicle velocity but also on such parameters as vehicle weight, vehicle velocity, suspension stiffness, etc., this function is rather empirical than analytical and should be determined individually for a given vehicle.

Obviously for the same steering angle there may be more than one value of turn radius. The turn radius function may thus be stored in the system memory as a look-up table, example of which is presented below in Table 2.

TABLE 2

| SA [deg] | V = 10 km/h R [m] | V = 60 km/h R [m] | V = 80 km/h R [m] |
|---|---|---|---|
| 5 | 50 | 50 | 50 |
| 10 | 40 | 42 | 43 |
| 15 | 30 | 34 | 35 |
| 20 | 20 | 26 | 27 |

The above relation may also include other parameters, accessible at the vehicle communication bus. In such a case, the above table shall be a multidimensional array. As the look-up table contains only some discrete values, to provide the turn radius for different conditions, one may alternatively use a simple interpolation function.

After determining the centrifugal acceleration during the vehicle turn, the true lateral acceleration can be easily estimated by the block 53 as:

$$YLG\_EST = YLG - YLG\_TURN$$

It should be noted that other implementations of the block 5 may take into account other vehicle states determined by implementations of block 3 different than the one described with reference to FIG. 2. For example, if the block 3 sets the vehicle state to quick slalom, the lateral acceleration shall be set by the block 5 to 0 m/s² corresponding to 0 deg of the accelerometer based angle (what is partially true as the car quickly rotates around 0 deg), and such value shall be transmitted to block 6 as estimated lateral acceleration signal. Since during slalom driving, such quick changes of a vehicle angle may be correctly calculated only by ARS sensor, the algorithm shall determine the rollover confidence only on the base of the ARS sensor signals, simultaneously ignoring the lateral acceleration.

The first preliminary stage of calculating of the estimated angle, performed by the block 4 shown in FIG. 1, is a multiplication of a measured vehicle roll rate (ARS) in a predefined time window ΔT to obtain the vehicle roll angle increment (ANG_ARS_DLT) in this predefined time window. This operation is known from the state of art and can be represented by the following formula:

$$ANG\_ARS\_DLT = ARS \cdot \Delta T$$

The time window (ΔT) is preferably within the range of 1 to 20 ms. The lower the ΔT, the more accurate calculations and more microcontroller throughput consumption. Practical value of ΔT should be a result of an engineering trade off.

As the ARS signal always contains some errors, the integration (or multiplication in the simplest case) thereof accumulates these errors and the roll angle obtained this way should not be used for determining the car inclination. Instead, as shown in FIG. 1, the estimated roll angle (ANG_EST) calculation is performed by block 6, the inputs of which are connected to block 4 providing the measured vehicle roll angle increment (ANG_ARS_DLT), block 5 providing the estimated lateral acceleration value (YLG_EST) and block 3 providing the vehicle state (STATE). The angle calculated by block 6 is therefore much more accurate than the roll rate based angle, accelerometer based angle or even simple combination of both angle types as disclosed in approaches known from the state of art.

Figure 4:
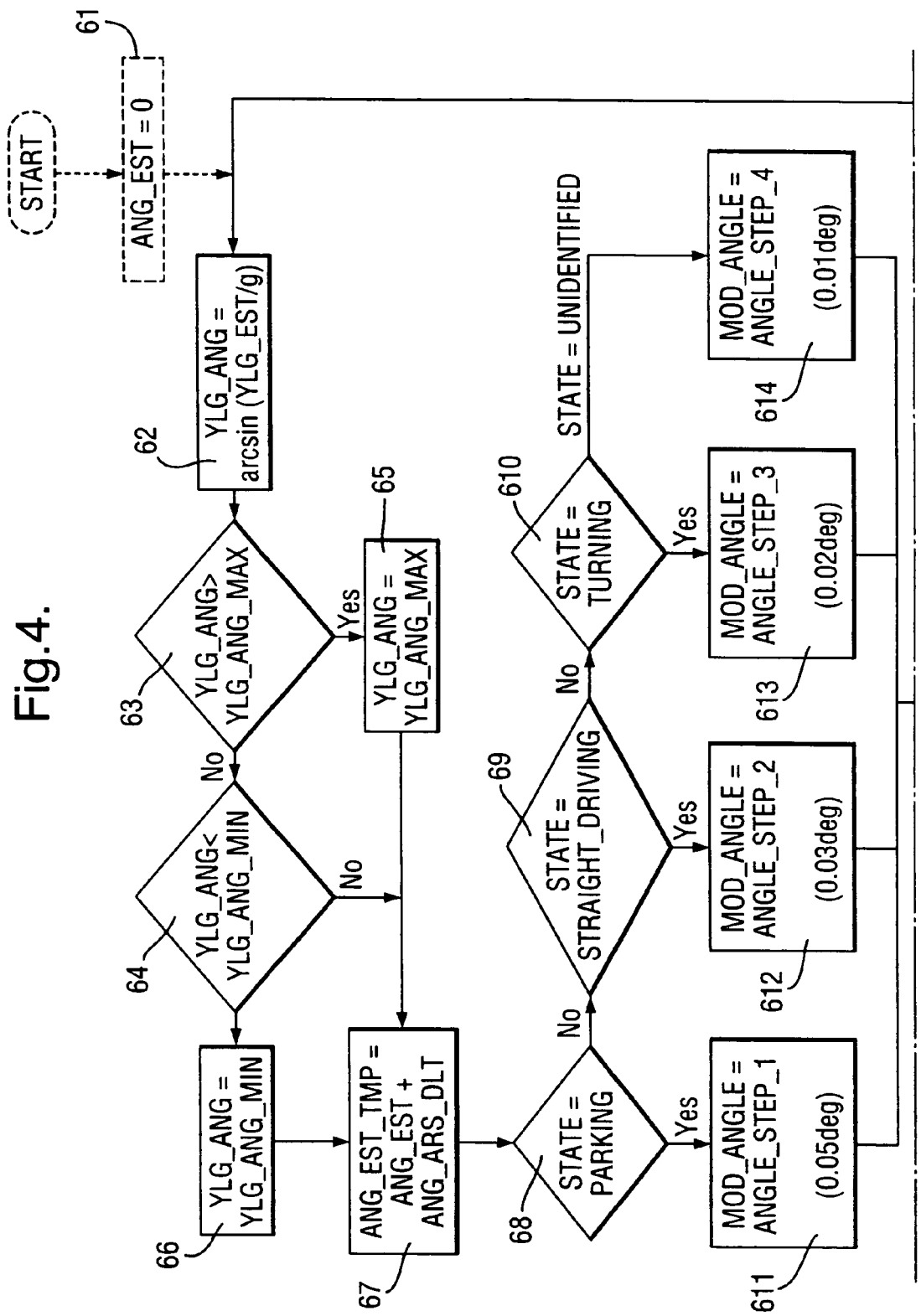
FIG. 4 is a flowchart of an embodiment of a block 6 from in FIG. 1.
Figure 4:
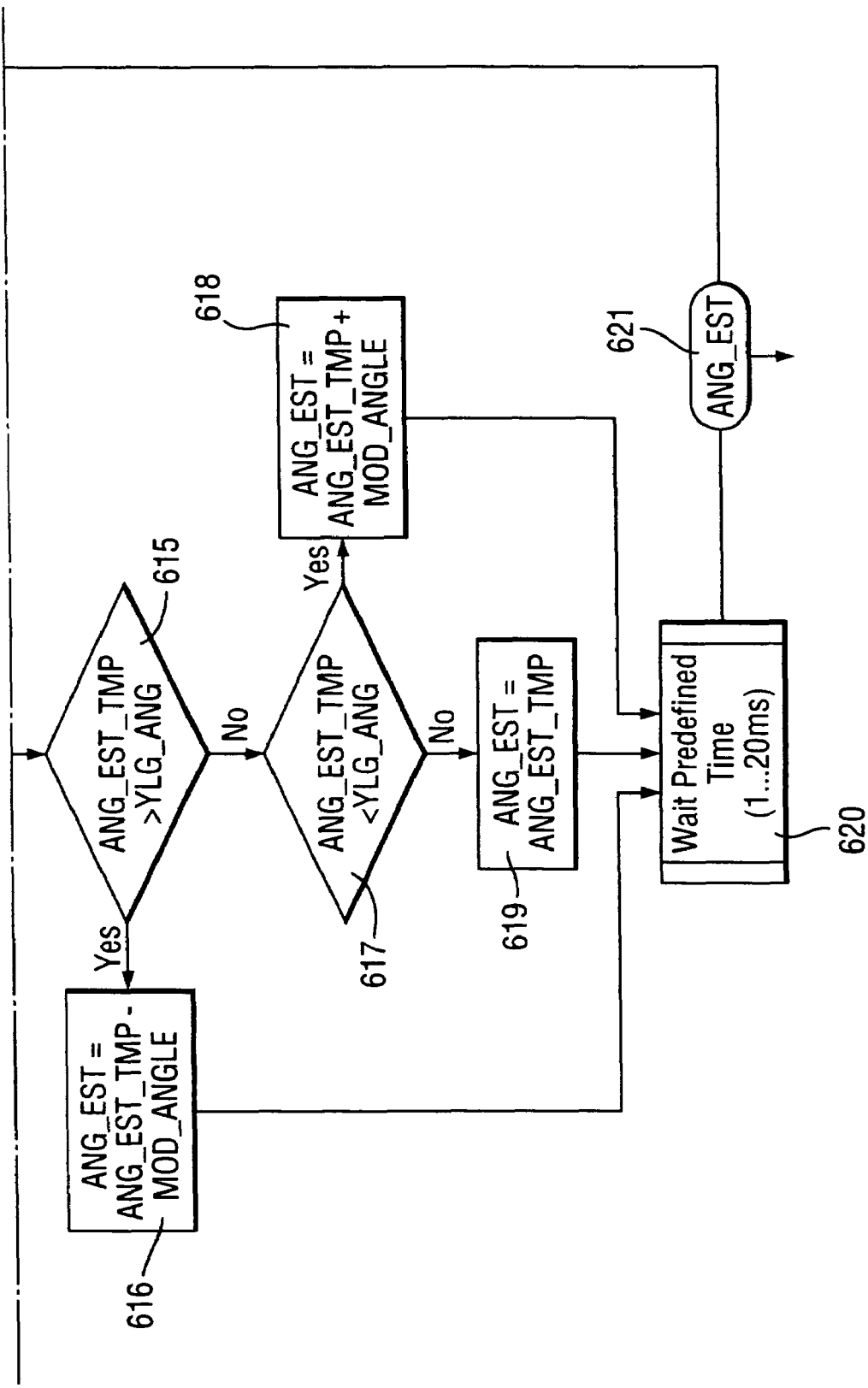
Figure 5A:
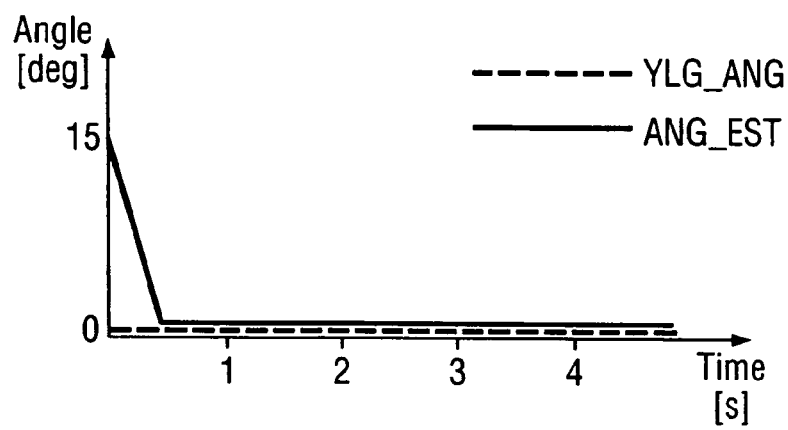
FIG. 5 is a graphical figure plotting time dependent angle adjustment executed by an embodiment of a block 6 shown in FIG. 4.
Figure 5B:
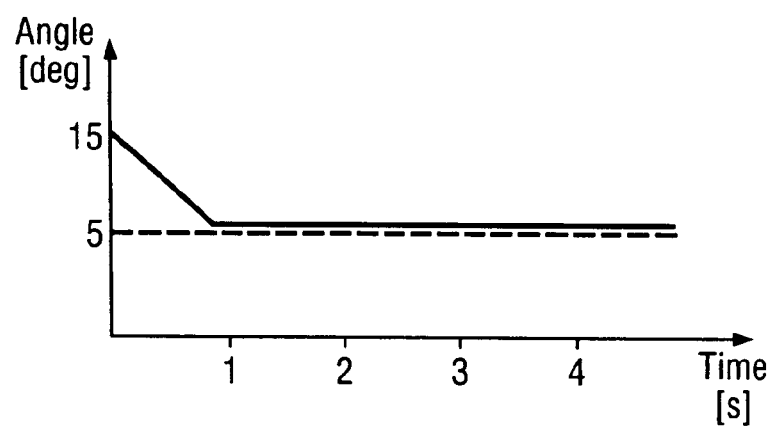
Figure 5C:
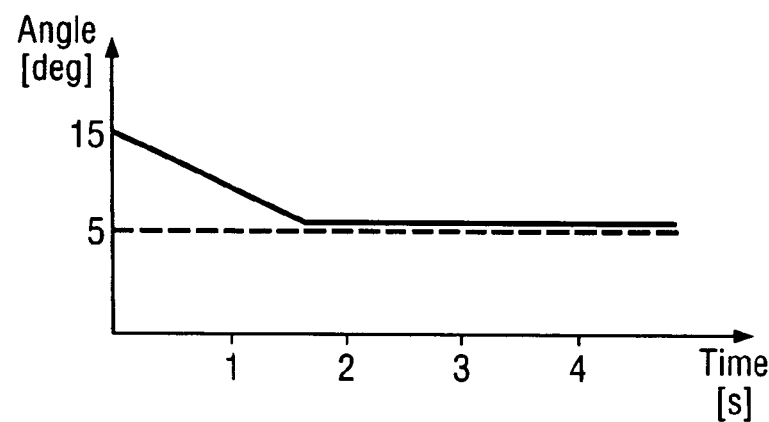
Figure 5D:
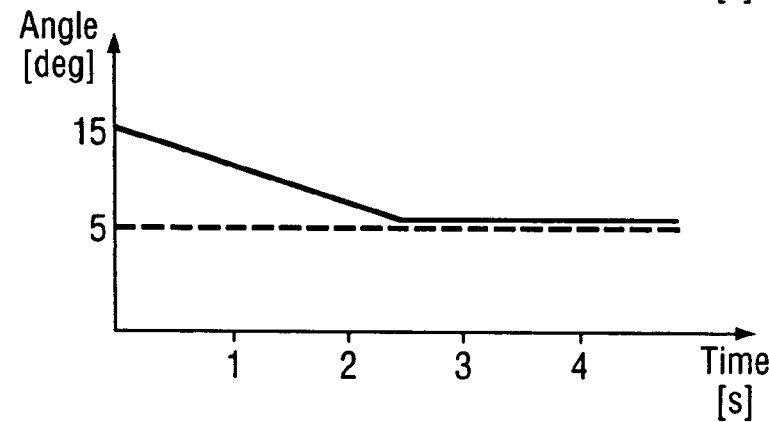

An example implementation of the block 6 is shown in FIG. 4 as a flow chart. The block 6 is a closed loop and works periodically in such a manner that in calculating the estimated roll angle (ANG_EST) for each iteration, the value of ANG_EST obtained at the previous iteration is used. At the initialization of the whole rollover detection system, the output/input value being the estimated roll angle (ARS_EST) is set in step 61 to zero, as the true roll angle of the vehicle is not known at this point yet.

Each iteration begins with calculating at the step 62 the accelerometer based angle (YLG_ANG) defined as:

$$YLG\_ANG = \arcsin(YLG\_EST/g).$$

Decision blocks 63 and 64 limit the accelerometer based angle to reasonable range of values that may practically arise. If the YLG_ANG value is greater than YLG_ANG_MAX or lower than YLG_ANG_MIN, i.e. out of the range boundaries, it shall be truncated by the corresponding decision block 63 or 64 and set in corresponding steps 65 or 66 to the boundary values, which in this example amount YLG_ANG_MAX=+20 deg and YLG_ANG_MIN=−20 deg.

Subsequently, in block 67, the actual vehicle roll angle increment (ANG_ARS_DLT), calculated by the block 4, is added to the estimated roll angle value (ARS_EST) from the previous iteration and result is written to temporary variable (ARS_EST_TMP).

Blocks 68, 69 and 610 are activated correspondingly for a given vehicle state, setting the angle modification value (MOD_ANGLE) accordingly. The MOD_ANGLE controls the rate of tracking of the ANG_EST value to the YLG_ANG value during the algorithm execution, that shall be described later with reference to FIG. 5, setting the appropriate tracking parameter MOD_ANGLE to ANGLE_STEP_1 (0.05 deg), ANGLE_STEP_2 (0.03 deg), ANGLE_STEP_3 (0.02 deg) or ANGLE_STEP_4 (0.1 deg) in dependence of the vehicle state.

Blocks 615, 616, 617, 618 and 619 implement the tracking of the YLG_ANG angle by the ANG_EST. The rate of this operation depends on the value of the MOD_ANGLE. If temporary value (ARS_EST_TMP) exceeds the accelerometer based angle (YLG_ANG), the actual estimated roll angle is calculated according to the formula ANG_EST=ANG_EST_TMP−MOD_ANGLE, whereas if temporary value (ARS_EST_TMP) is below the accelerometer based angle (YLG_ANG), the actual estimated roll angle is calculated according to the formula ANG_EST=ANG_EST_TMP+MOD_ANGLE. Otherwise the actual estimated roll angle remains unchanged i.e. ANG_EST=ANG_EST_TMP.

Timer block 620 transmits the actual estimated roll angle and provides control again to the input of the block 6 with predefined delay. The time period of the block 620 is preferably set within the range of 1 to 20 ms and should equal ΔT in block 4 in order to avoid ARS based angle integration errors.

The ANG_EST value is delivered to the vehicle communication bus by block 621.

FIG. 5 explains the tracking of the YLG_ANG angle by the ANG_EST for a given vehicle state. The tracking process progresses most quickly in the case of an UNIDENTIFIED state (FIG. 5a) where ANG_EST signal approaches zero approximately at the rate of 30 deg/s. Also in the PARKING state (FIG. 5b) the ANG_EST signal is relatively quickly set to the accelerometer based angle (YLG_ANG). During the STRAIGHT_DRIVING state (FIG. 5c), the lateral acceleration (and in consequence YLG_ANG) is considered as accurate, so ANG_EST is also quickly modified. In TURNING state (FIG. 5d) however, the lateral acceleration is influenced by centrifugal force, thus YLG_ANG is not considered as accurate and the ANG_EST signal is corrected the most slowly to avoid introducing mayor errors in angle calculation.

The final algorithm decision is undertaken by the block 7, which as the other blocks of the system should be individually designed in dependence of a given vehicle type (e.g. SUV, convertible, truck, etc.), applied safety restraints, etc.

Figure 6:
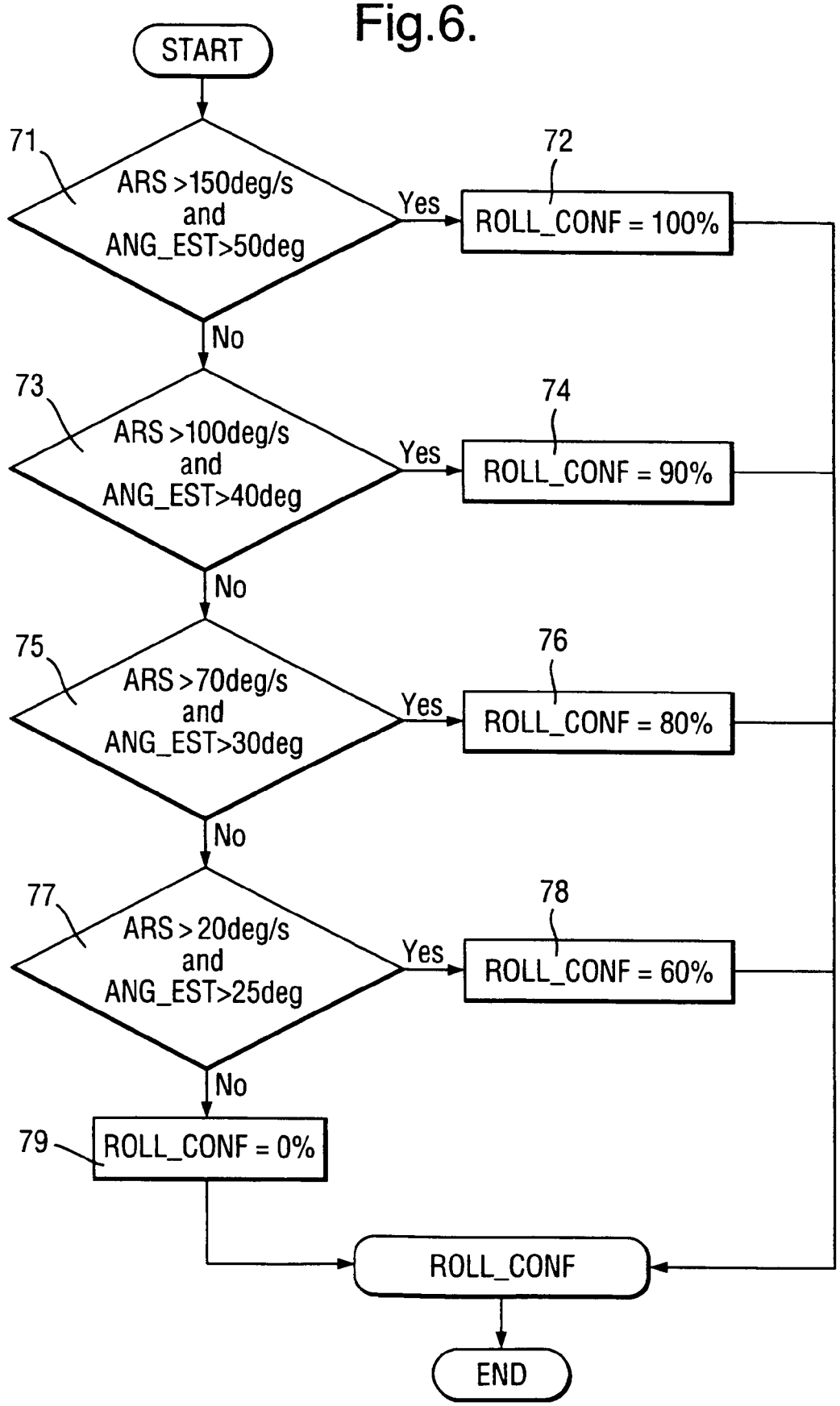
FIG. 6 is a flowchart of an embodiment of a block 7 from FIG. 1.

An exemplary implementation of the block 7 is shown in FIG. 6. Here the only inputs of the block 7 are the estimated roll angle (ANG_EST) and the vehicle roll rate (ARS). For every iteration, in a sequence of serially executed steps, the decision blocks 71 to 77 checks, whether input values (ANG_EST, ARS) are simultaneously higher than the boundary values (ANG_EST_MAX(I), ARS_MAX(I)) defined separately for each step (I), starting with the higher boundary values. If it happens, the checking process is stopped at a given decision block and the output of the block 7 is a rollover confidence value (100, 90, 80 and 60%) corresponding to this set of input values. In this example the boundary values ANG_EST_MAX are set to 150, 100, 70 and 20 deg/s while the boundary values ARS_MAX are set to 50, 40, 30 and 25 deg. Such an algorithm provides shortening of a decision time and low program memory consumption in case of the microcontroller implementation.

The output of the block 7 is connected to the triggering block, not shown in FIG. 6, and additionally to other car systems. The outputs of the triggering block are connected directly to particular protection devices and are activated in response to rollover confidence thresholds defined above. Thus in dependence of the estimated ROL_CONF value, the rollover detection system may deploy an appropriate protection device, e.g. resetable seatbelts in case the confidence is greater than 60%, rollover bars in case the confidence is greater than 80% and airbags if the confidence is higher than 90%.

Figure 7:
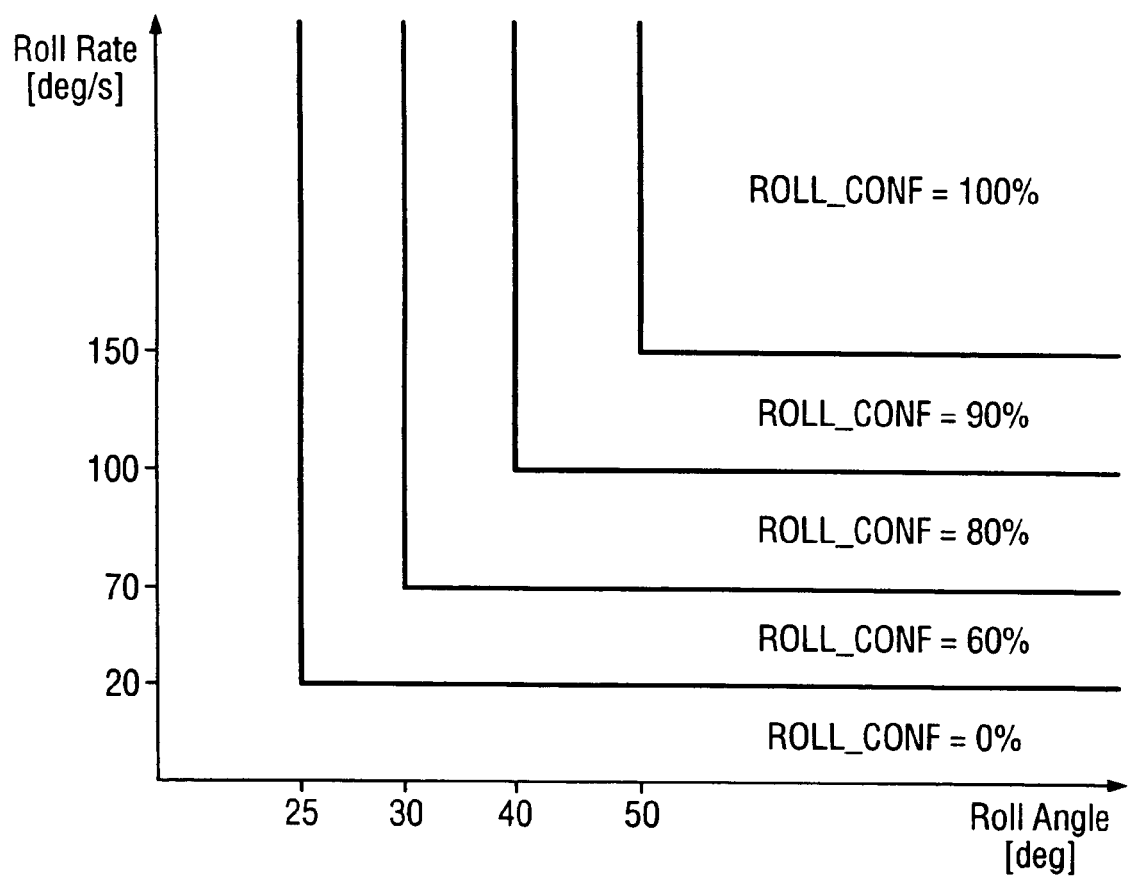
FIG. 7 is a further graphical figure showing the rollover confidence estimation as executed in an embodiment of a block 7 shown in FIG. 6.

FIG. 7 shows a mode of operation of a block 7. As shown, the ROL_CONF thresholds are represented by semi-rectangular plane sectors delimited by appropriate boundary values ANG_EST_MAX(I) and ARS_MAX(I).

Figure 8:
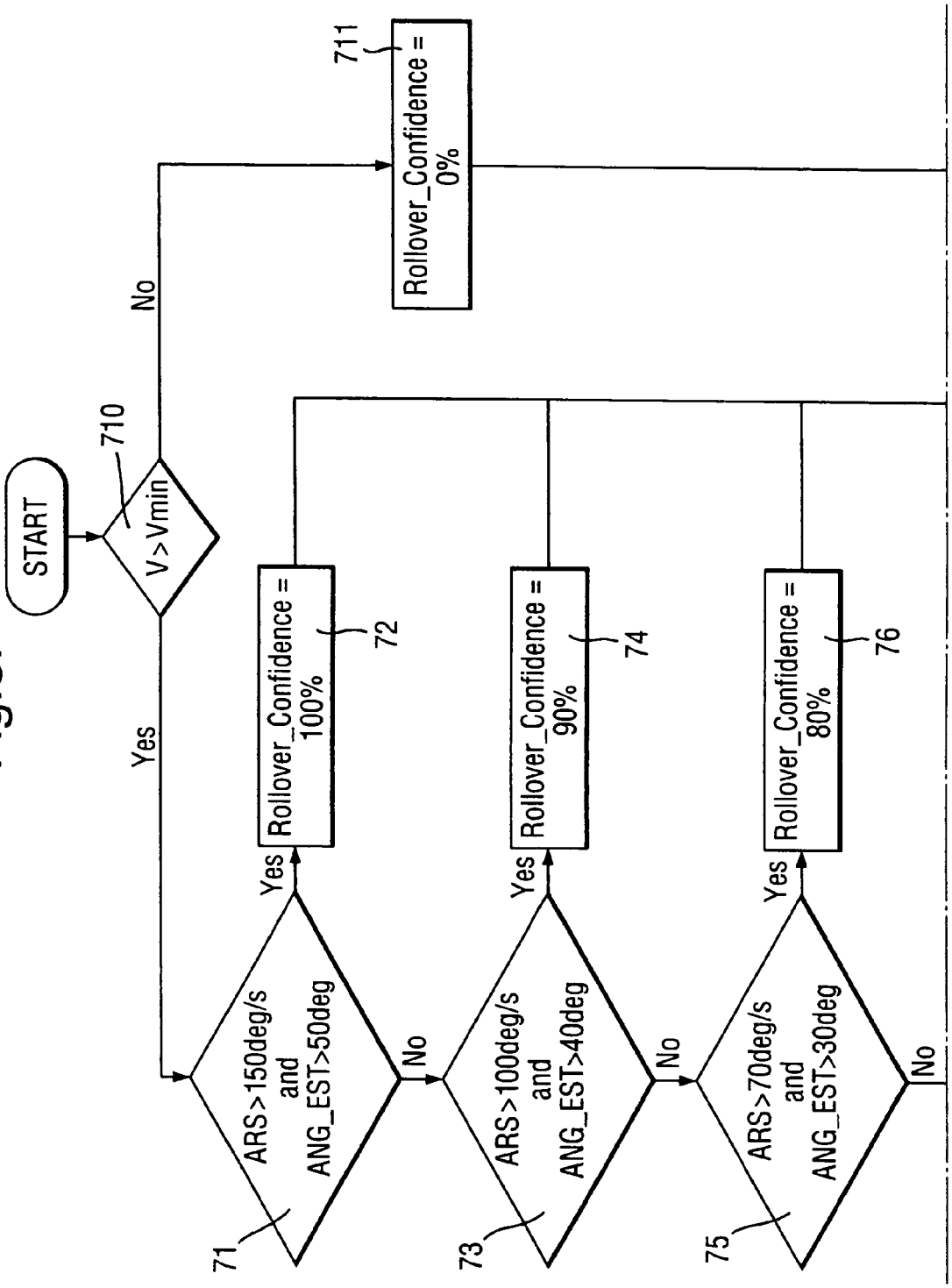
FIG. 8 is a flowchart of another embodiment of a block 7 from FIG. 1.
Figure 8:
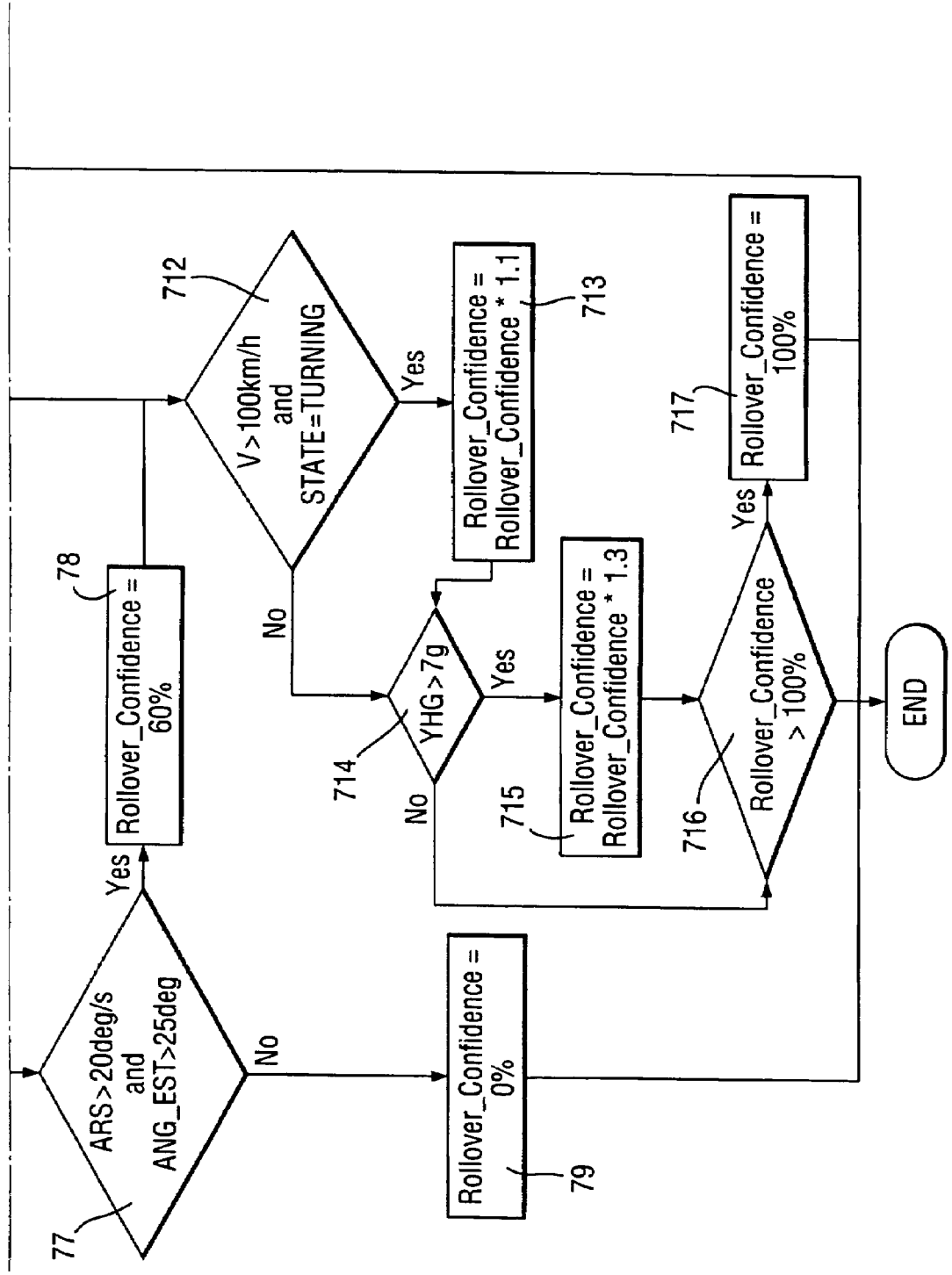

FIG. 8 shows another more advanced implementation of the block 7. Reference numerals of the elements corresponding to the embodiment shown in FIG. 6 remain the same. In this example, the final algorithm decision is undertaken by block 7 on the basis of the estimated roll angle (ANG_EST), the vehicle roll rate (ARS), vehicle state (STATE) as well as additional signals from vehicle communication bus, i.e., vehicle velocity (V) and lateral acceleration (YHG), obtained from auxiliary lateral High-G sensor. It is worth noting that lateral High-G sensors are commonly used by front/rear/side crash detection systems and thus their signal is readily available in almost every car.

In the first step the decision block 710 checks if the vehicle speed exceeds predefined threshold value ($V_{min}$). If so, the rollover confidence is determined on the base of the values of ARS and ANG_EST in the same manner as described with reference to FIG. 6. Subsequently, if such calculated rollover confidence is greater than zero, it may be modified on the base of the other signals mentioned above by group of blocks 712 to 717. The modification may comprise the multiplication of the rollover confidence by appropriate coefficient (e.g. 1.1 or 1.3) in dependence of the vehicle speed and/or vehicle lateral acceleration exceeding the predefined thresholds of the decision blocks 712, 714 and 716. If the vehicle velocity is below the predefined threshold value ($V_{min}$), in which case the rollover is rather unlikely, the output of the block 7 is directly set to zero to suppress the rollover detection. Such a situation may happen e.g. in case of painting of the car with a key left in the ignition lock.

The invention claimed is:

1. A method of detecting a vehicle rollover comprising the steps of
   (a) measuring a set of input signals including at least a vehicle velocity, a vehicle steering angle, a vehicle lateral acceleration, and a vehicle roll rate;
   (b) integrating the vehicle roll rate to obtain a vehicle roll angle increment;
   (c) determining a vehicle state on the basis of the input signals;
   (d) determining a vehicle estimated lateral acceleration based upon the vehicle state, the vehicle lateral acceleration, and a centrifugal acceleration;
   (e) determining a vehicle estimated roll angle on the basis of at least the vehicle roll angle increment, the vehicle estimated lateral acceleration and the vehicle state; and
   (f) generating an output activation signal determining a possibility of rollover of the vehicle, as a function of at least: the vehicle estimated roll angle and the vehicle roll rate.

2. A method according to claim 1, characterized in that, the vehicle state and/or other signals are additionally used as inputs for said step of generating the output activation signal.

3. A method according to claim 1, characterized in that, the vehicle state is chosen from at least parking, straight driving and turning.

4. A method according to claim 1, characterized in that, the calculation of the centrifugal acceleration performed in step (d) of determining the vehicle estimated lateral acceleration, is based on the vehicle velocity and a vehicle turn radius.

5. A method according to claim 4, characterized in that, the turn radius is calculated as a function of the vehicle steering angle, vehicle parameters and the vehicle velocity.

6. A method according to claim 1, characterized in that, said step of generating an output activation signal comprises a sequence of serially executed steps of checking whether the input signals values are simultaneously higher than the boundary values defined separately for each step, said sequence starting with the higher of said boundary values.

7. A method according to claim 1, characterized in that, said step of generating an output activation signal makes use of a lookup table.

8. A method according to claim 1, characterized in that, the at least one input signals value is sustained for a predefined period.

9. A method according to claim 1, characterized in that, at least one of the input signals is pre-processed.

10. A method according to claim 9, characterized in that, pre-processing involves at least one of signal scaling, removing a signal drift, or filtering a signal.

11. A method according to claim 1, characterized in that, it further comprises a step of activation of at least one protection device for protecting an occupant of a vehicle.

12. A system of detecting a vehicle rollover implementing the method claimed in one of the preceding claims.

* * * * *